(12) United States Patent
Zhang

(10) Patent No.: US 8,386,220 B2
(45) Date of Patent: Feb. 26, 2013

(54) SPECIAL TREATMENT ON CIRCULAR RING PART OF THE OLED BANK STRUCTURE WITH SURFACE EVOLVER

(75) Inventor: Jie Zhang, Santa Clara, CA (US)

(73) Assignee: Seiko Epson Corporation, Tokyo (JP)

(*) Notice: Subject to any disclaimer, the term of this patent is extended or adjusted under 35 U.S.C. 154(b) by 519 days.

(21) Appl. No.: 12/639,433

(22) Filed: Dec. 16, 2009

(65) Prior Publication Data

US 2011/0144964 A1 Jun. 16, 2011

(51) Int. Cl.
*G06G 7/48* (2006.01)
(52) U.S. Cl. .......................................... 703/6
(58) Field of Classification Search ................ 703/6
See application file for complete search history.

(56) References Cited

U.S. PATENT DOCUMENTS

| | | | | |
|---|---|---|---|---|
| 7,291,970 B2 * | 11/2007 | Kuwabara | ..................... | 313/504 |
| 2004/0120684 A1 * | 6/2004 | Ishibashi et al. | ............... | 385/141 |
| 2007/0046764 A1 * | 3/2007 | Nakazawa | .................... | 347/224 |

OTHER PUBLICATIONS

Brakke, Kenneth A., "Surface Evolver Manual, Version 2.26", Aug. 25, 2005, Mathematics Department, Susquehanna University, pp. 9, 10 and 16-20.*
Ikegawa, Masato et al., "Droplet Behaviors on Substrates in Thin-Film Formation Using Ink-Jet Printing", 2004, JSME International Journal, vol. 47, No. 3.*
Bussmann, M. et al., "On a Three-Dimensional Volume Tracking Model of Droplet Impact", Jan. 29, 1999.*
Langemann, Dirk, "A Droplet in a Stationary Electric Field", Jun. 11, 2003, Elsevier B.V.*
Cortis, C., et al., "An Automatic Three-Dimensional Finite Element Mesh Generation System for the Poisson-Boltzmann Equation", Journal of Computational Chemistry, vol. 18, No. 13, pp. 1570-1590, Mar. 1997.
Cordes, L. W., et al., "Treatment of Material Discontinuity in the Element-Free Galerkin Method", Elsevier, Computer Methods in Applied Mechanics and Engineering, Apr. 1996.
Tezduyar, T. E., et al., "A New Strategy for Finite Element Computations Involving Moving Boundaries and Interfaces—The Deforming-Spatial-Domain/Space-Time Procedure: II. Computation of Free-Surface Flows, Two-Liquid Flows, and Flows with Drifting Cylinders", Computer Methods in Applied Mechanics and Engineering 94, 1992.
Camacho, Daniel L. A., et al., "An Improved Method for Finite Element Mesh Generation of Geometrically Complex Structures with Application to the Skullbase", Elsevier, J. Biomechanics, vol. 30, No. 10, pp. 1067-1070, 1997.
George, A., "Nested Dissection of a Regular Finite Element Mesh", Siam J. Numer Anal. vol. 10, No. 2, Apr. 1973.
Brakke, K. A., "Surface Evolver Manual", Version 2.30, Jan. 1, 2008.

* cited by examiner

*Primary Examiner* — Kamini S Shah
*Assistant Examiner* — Cedric D Johnson

(57) ABSTRACT

Systems and methods for representing a surface with faces. Defining a face with inner and outer concave constraint lines. Representing the face with five initial vertices spread equidistant on each of the inner and outer concave constraint lines. Using a triangulation refinement method to transform the initial set of vertices into a first set of representative vertices.

9 Claims, 16 Drawing Sheets

SPECIAL TREATMENT ON CIRCULAR RING PART OF THE OLED BANK STRUCTURE WITH SURFACE EVOLVER

BACKGROUND

1. Field of Invention

The present invention is related to systems and methods for determining a surface profile of a droplet on a complex surface.

2. Description of Related Art

Applying inkjet technology to the industrial printing process can greatly improve its efficiency. Inkjet technology can be used to save energy, material, money, and it can also help improve the environment. Inkjet technology may be used in the manufacture of liquid crystal displays (LCD), thin film transistors (TFT), organic light emitting diodes (OLED), solar cells, micro-circuits, and other planar, layered, or 3-D structures. In the inkjet printing process, small droplets of a solution are deposited onto a target area.

Once the droplet is deposited onto a substrate it takes on an initial equilibrium droplet shape. The droplet shape is defined by a droplet interface. The droplet interface represents the extant of the droplet within an environment. The droplet interface is very dependent upon the contact angle of the droplet and the droplet volume. The contact angle is an angle at which the droplet interface intersects the substrate. The contact angle is dependent upon the interaction of the droplet, the substrate, and the environment. Although not trivial, simulation tools do exist that provide reasonably accurate estimates of the droplet interface when the substrate is flat.

One method of estimating a droplet interface is to use a minimization routine such as the one found in Surface Evolver that starts with an initial guess of the shape of the droplet interface and then minimizes an energy function to come up with a better estimate of the droplet interface. This method can work well, if the initial guess is good, the substrate is flat, and the energy function is accurate. Obtaining an optimum droplet interface when the substrate is not flat can be very difficult and is very dependent upon the initial guess. For example, if the substrate includes a curved bank structure such as those found in OLED production can be very difficult.

The present invention is directed towards systems and methods for making an initial estimate of the shape of a droplet given the shape of the substrate, the volume of the droplet, and the contact angle.

SUMMARY OF INVENTION

An embodiment of the present invention may be a system or method for determining an equilibrium shape of a droplet on a substrate. Simulating the physical process may include using a simple triangulation procedure.

An embodiment of the present invention may be a computer-readable medium encoded with instructions for a processor to represent a surface including at least one face. The surface may include a plurality of faces including a first face. The extant of the first face may be defined with a plurality of initial constraint lines. The initial constraint lines include: a first inner concave constraint line; and a first outer concave constraint line.

The first face is also represented with an initial set of vertices including: five initial vertices spread equidistant on the first inner concave constraint line; and five additional initial vertices spread equidistant on the first outer concave constraint line.

A triangulation refinement method is used to transform the initial set of vertices into a first set of representative vertices. The triangulation refinement method produces a second set of representative vertices that successfully represents a second face. The second face is defined with: four initial vertices; a second inner concave constraint line; and a second outer constraint line; wherein a radius of curvature of the second inner concave constraint line is a first value;

The triangulation refinement method produces a third set of representative vertices that fails to represent the first face when the radius of curvature of the inner concave constraint line is greater than ten times the first value and the first face is defined with less than ten vertices.

The triangulation refinement method produces the first set of representative vertices that successfully represent the first face when the radius of curvature of the inner concave constraint line is greater than ten times the first value, and the initial set of vertices includes at least ten vertices to represent the first face.

In an embodiment of the present invention the plurality of initial constraint lines may also include a first convex constraint line. In an embodiment of the present invention the plurality of initial constraint lines may further include a second convex constraint line.

In an embodiment of the present invention the initial vertices may include a first vertex that represents an intersection of the first inner concave constraint line and the first convex constraint line. In an embodiment of the present invention the initial vertices may also include a second vertex that represents an intersection of the first inner concave constraint line and the second convex constraint line. In an embodiment of the present invention the initial vertices may also include a third vertex that represent an intersection of the first outer concave constraint line and the first convex constraint line. In an embodiment of the present invention the initial vertices may also include a fourth vertex that represents an intersection of the first outer concave constraint line and the second convex constraint line.

In an embodiment of the present invention the surface represents a non-flat substrate on which a droplet is resting and the triangulation refinement method is part of a simulation method used to determine an equilibrium shape of the droplet. In an embodiment of the present invention the surface represents a non-flat substrate and the first face represents a concave convex corner on the non-flat substrate. In an embodiment of the present invention the surface represents an OLED bank structure. In an embodiment of the present invention the triangulation refinement method is included in the Surface Evolver software package. In an embodiment of the present invention the initial vertices may also include the initial set of vertices are defined in a data file that is to be read by the Surface Evolver software package.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
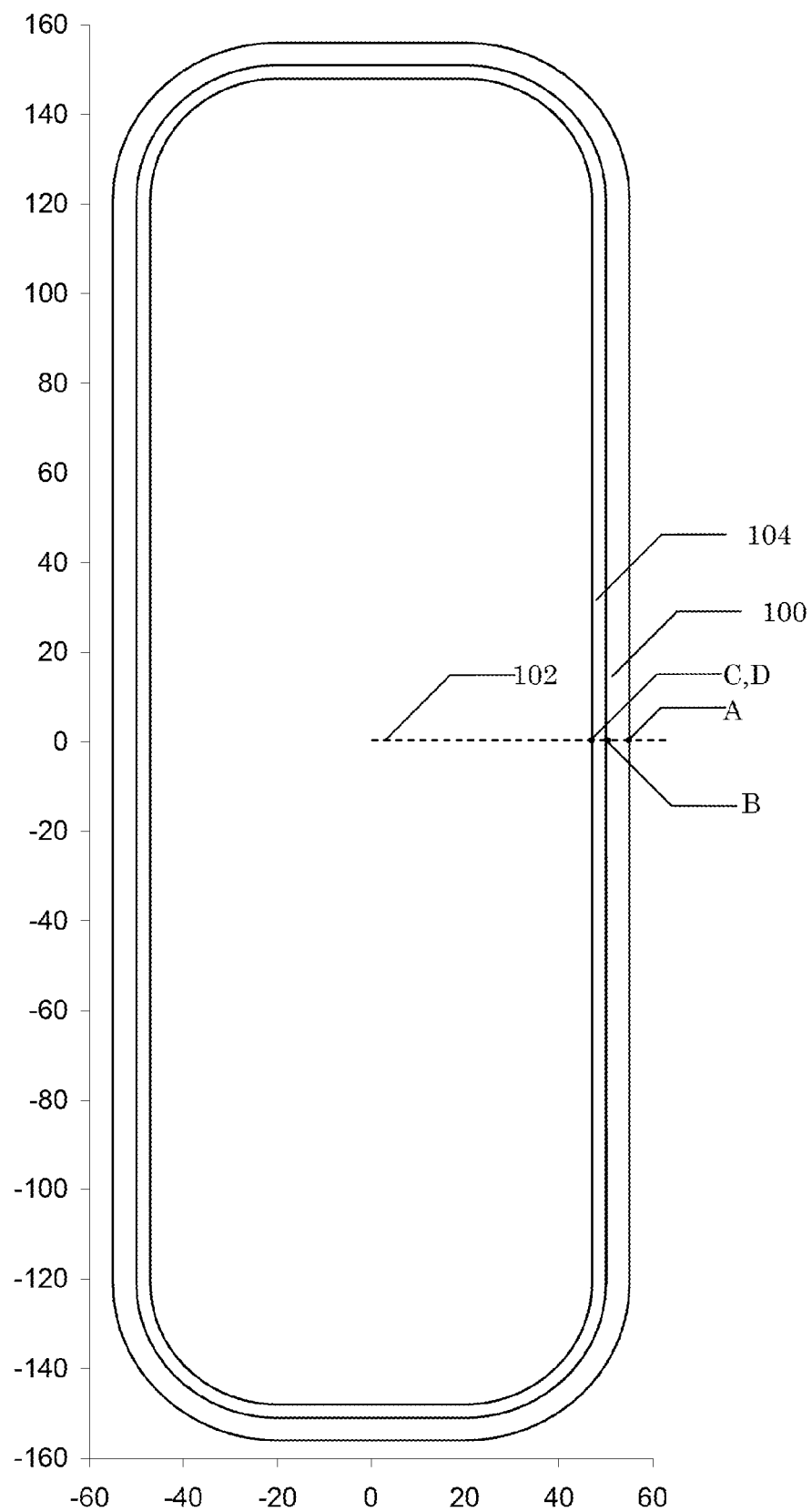
FIG. 1 is an illustration of a top view of an OLED bank structure.

The present invention may be used to provide a representation of an initial droplet profile. The initial droplet profile may be used along with a lubrication model to simulate the evaporation of a droplet. The lubrication model requires an initial droplet profile to begin the simulation. The droplet may be evaporating on a complex three dimensional substrate. The complex substrate may include a bank structure. The bank structure may be representative of the bank structures found in OLED structures. The initial droplet shape is dependent upon the substrate, the contact angle, and the droplet volume. There can be large variations in the shape of the droplet.

The outer edge of the droplet is defined as a contact line. The contact line is the intersection of droplet interface with the substrate. The contact line may be a three dimensional curve in space that does not fall on a flat plane.

Under most conditions, the equilibrium shape of a droplet is the one with the minimum surface energy. Surface Evolver is a general purpose software package for studying the shape of surfaces. Surface Evolver may be used to minimize the energy associated with a particular surface subject to specific constraints. An embodiment of the present invention may use Surface Evolver to determine the minimum energy associated with a particular surface. An alternative embodiment of the present invention may use alternative methods that may make use of the calculus of variations to minimize the surface energy. Other methods of finding an equilibrium shape of the droplet may include genetic algorithms, general search routines, and statistical methods. An individual skilled in the art will appreciate how to adapt the present invention to other methods of determining an equilibrium shape of a droplet.

The present invention is directed towards describing a complex geometrical constraint on a surface. An example of a complex geometrical constraint is that of the surface of an Organic Light Emitting Diode (OLED). The geometrical constraint may be a bank structure of the OLED.

In an embodiment of the present invention a droplet body may be used to represent the shape of the droplet in a three dimensional region of space. The droplet body may include a region of space enclosed by facets. Each facet is an oriented polygon defined by three or more edges. Each edge is an oriented segment between a tail vertex and a head vertex. Each vertex is a point in the region of space.

The droplet body may represent an enclosed region of space defined by a plurality of surfaces. The enclosed region of space may describe an enclosed volume, whose size is kept constant. The plurality of surfaces may include constrained surfaces such as those that represent the substrate. The plurality of surfaces may also include free surfaces such as those that represent the liquid-air interfaces. Each face may be defined in terms of the curvature of the surface on the internal portion of the face inside the volume. In the context of the present invention, a face is considered convex if it is convex when defined from the perspective of the interior of the enclosed region. While the same face may possibly be concave when defined from exterior of the enclosed region it will nonetheless be considered to be a convex surface in the context of the present invention.

The complex geometry of the OLED bank structure includes surfaces that are both concave and convex. As noted in the Surface Evolver Manual, version 2.30, page 212, "Initial faces should be convex. Although Evolver handles nonconvex faces, the triangulation algorithm is very simple-minded, and the triangulation of a nonconvex face can be ugly. Just put in an extra edge or two to divide the face into a couple of convex faces." The applicants have found a way to handle a nonconvex face with a very simple-minded triangulation method such as the one used in the Surface Evolver program, while still retaining the nonconvex nature the face.

The OLED Bank Structure

FIG. 1 is an illustration of a top view of an OLED bank structure 100 that an embodiment of the present invention may represent as a geometrical constraint on a droplet. As shown in FIG. 1 the OLED bank structure from top down may be represented as two concentric rectangles with rounded corners. The bounds of the OLED bank structure are defined by the two concentric rectangles. The corners of the bank structure as seen from the top down take on the appearance of a portion of a circular ring. FIG. 1 is merely illustrative and is not drawn to scale.

Figure 2A:
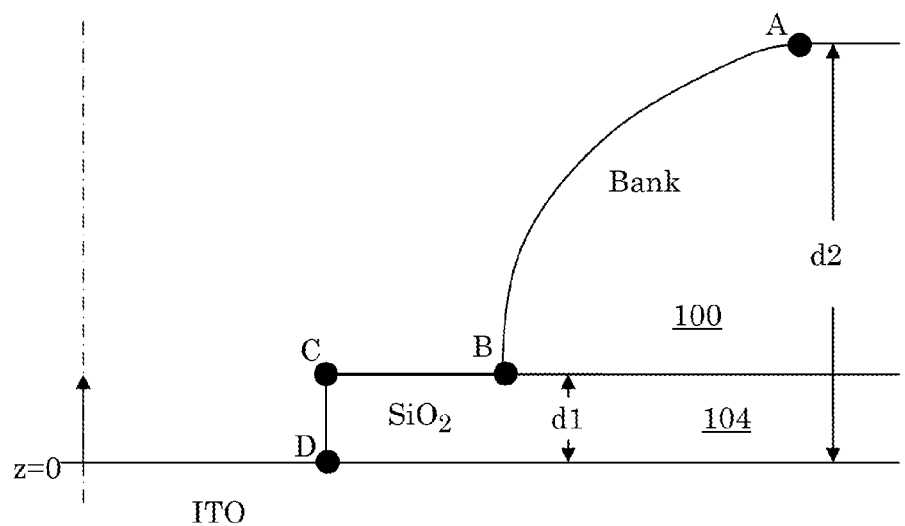
FIGS. 2A-B are illustrations of a cross section of the OLED bank structure.

FIG. 2A is an illustration of a cross section of the OLED bank structure 100 along section line 102. Points A, B, C, and D are points along section line 102. As shown in FIG. 2A, the OLED bank structure may be resting on Indium Titanium Oxide (ITO). The ITO layer may be a substrate or a thin film on a separate substrate. The OLED bank structure may rest on different material without going beyond the scope and spirit of the present application. A thin silicon oxide ($SiO_2$) layer 104 with a thickness of d1 may be resting upon the ITO layer. A bank structure 100 may rest upon the thin $SiO_2$ layer 102. In an illustrative example, the thickness d1 of the $SiO_2$ layer 104 may be 0.05 µm. Other thicknesses of the $SiO_2$ layer 104 may be used without going beyond the scope and spirit of the present invention.

The profile of the bank structure 100 as shown in FIG. 2A is a convex curve that may be represented by a cubic polynomial. Other curves may be used without going beyond the scope of the present invention. In an illustrative example, the height d2 of the bank structure 100 above the ITO layer may be 2.2755 µm. The bank structure may also be made of $SiO_2$. FIG. 2A is not drawn to scale and is used to show the salient features of the bank structure.

Figure 2B:
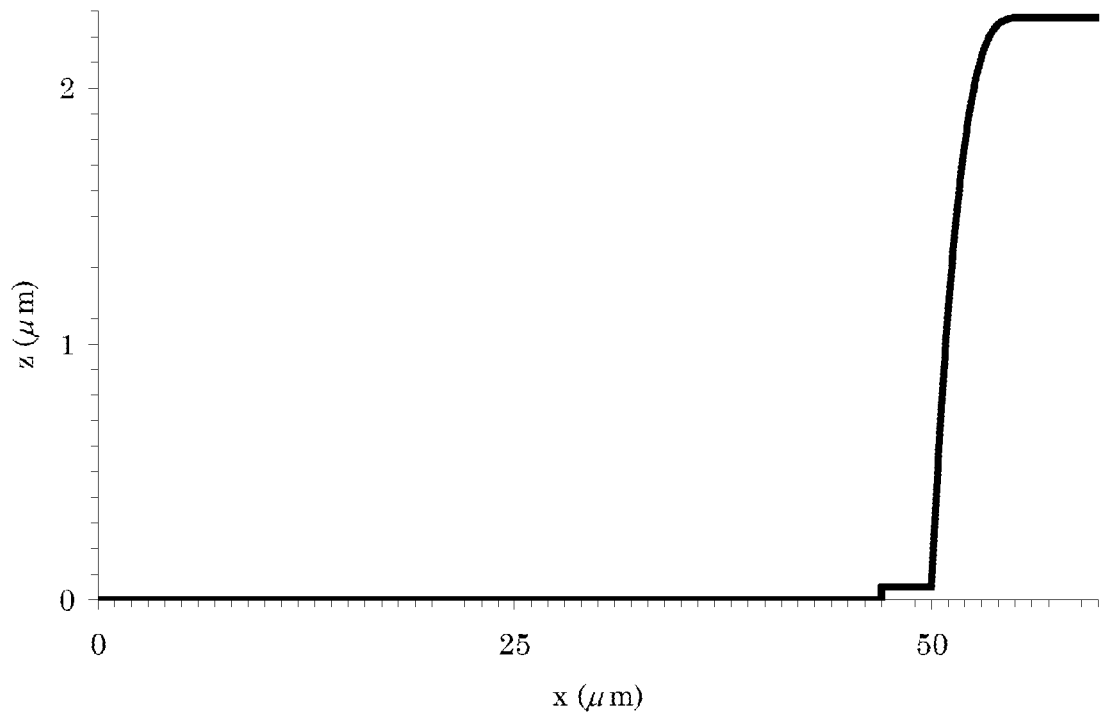

FIG. 2B is an illustration of the OLED bank structure 100 along section line 102 that an embodiment of the present invention may be used to represent. Note that when drawn to scale the bank structure 100 is a convex surface that deviates from the perpendicular.

The OLED bank structure may be represented by a set of faces. The set of faces include: a first set of flat faces; a second set of convex faces; and a third set of concave-convex faces. The set of convex faces may include four faces that are convex along a first axes and planar along a second axes. The set of convex faces may be found along the side walls of OLED bank structure. The set of convex-concave faces are convex along a first axes and concave along a second axes. The set of convex-concave faces may be found at the corners of the OLED bank structure.

Flat Face

Figure 3A:
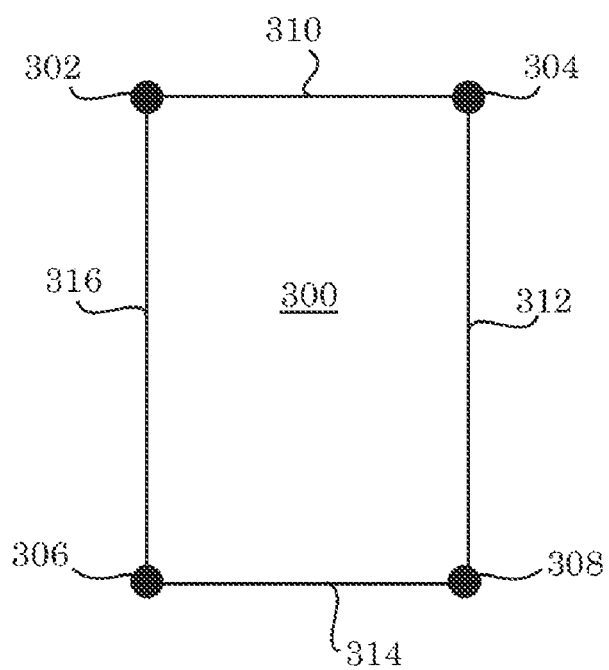
FIGS. 3A-3B are illustrations of a flat face.

Each face may represented by three or more vertices and one or more constraints. For example a flat face 300 as illustrated in FIG. 3A may be defined in terms of four vertices (302, 304, 306, and 308). There may be a constraint on the face 300 that it remains planar and any additional faces that are formed from face 300 may inherit the constraints on the original face and be required to stay in a plane occupied by the four vertices (302, 304, 306, and 308). There may be an additional constraint on the four vertices (302, 304, 306, and 308) that their spatial position is fixed. There may also be an additional constraint that the positions of the edges of the face (310, 312, 314, and 316) remain constant.

In an embodiment of the present invention it may be advantageous to represent each face as a plurality of facets. In the following discussion a facet is described as a two-dimensional triangle located in a three dimensional space. Each facet may be a bounded surface described by 3 vertices, 3 edges, and one face. An individual skilled in the art will appreciate that the present invention may be adapted to higher dimensional facets.

Figure 3B:
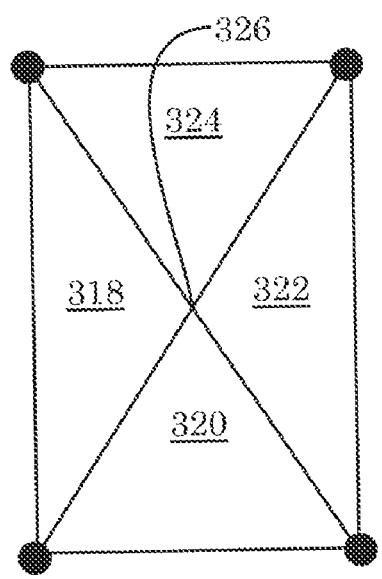

FIG. 3B is an illustration of flat face 300 represented by four facets (318, 320, 322, and 324). This may include creating an additional vertex 326 that is shared by the four facets (318, 320, 322, and 324). The vertex 326 may inherit the constraint that it remains in the plane of face 300, but its position is not necessarily so limited. This may also include the creation of four new edges, each new edge shared by two facets. The new edges may also inherit the constraint that they remain in the plane of face 300. Alternatively, the face 300 may be represented by two facets.

Convex Face

Figure 4A:
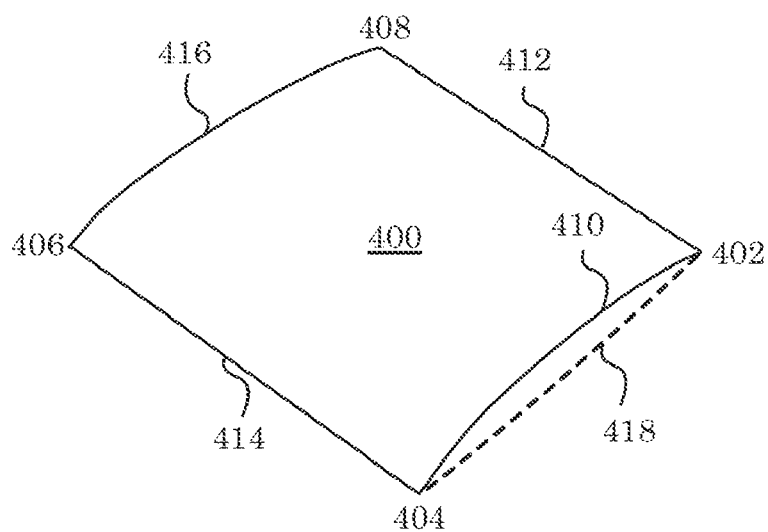
FIGS. 4A-4C are illustrations of a convex face.

FIG. 4A is an illustration of a convex face 400 that is convex along one axes and planar along a second axes. The convex face 400 may be defined in terms of four vertices (402, 404, 406, and 408), two edges (412, and 414), and two line constraints (410 and 416). The line constraints 410 and 416 describe a curved line segment in a three dimensional space. In an embodiment of the present invention each line constraint may be approximated a plurality of edges. For example line constraint 410 may be approximated with an edge 418.

Figure 4B:
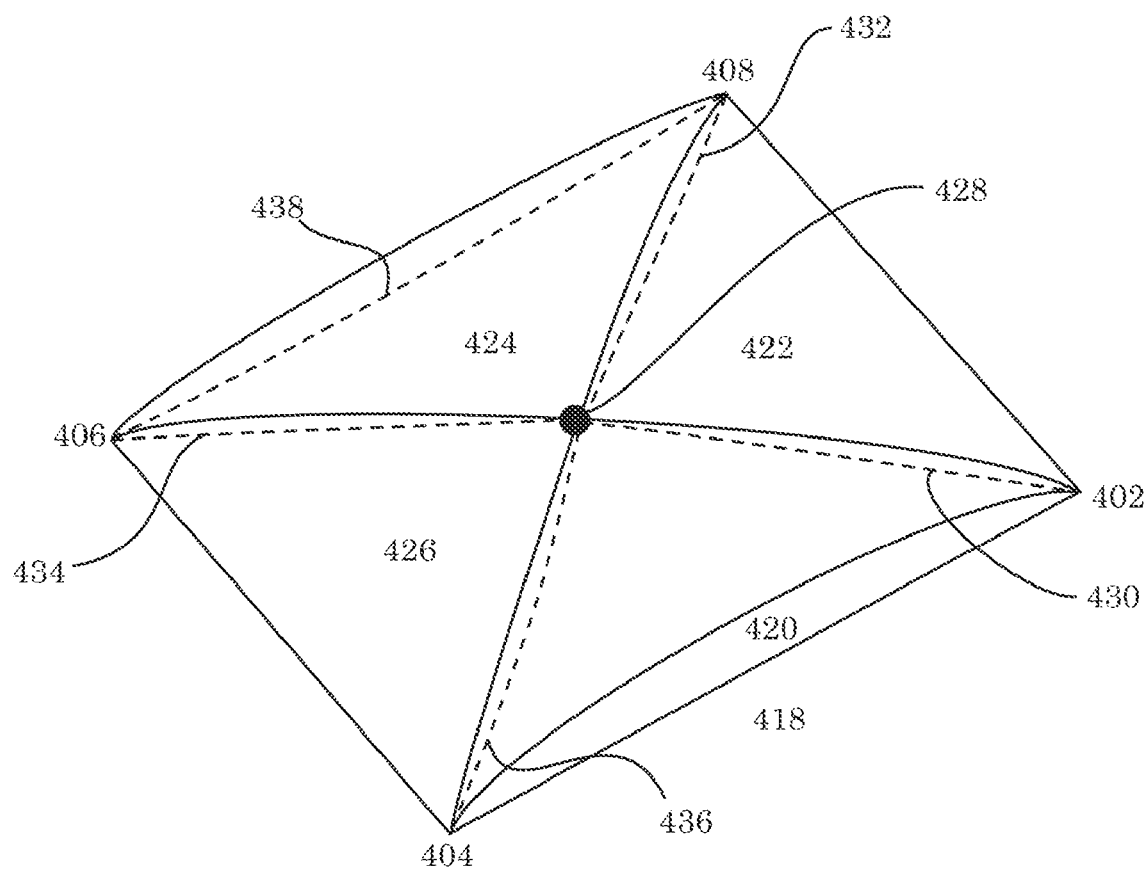

As with the flat face 300, it may be advantageous to approximate the convex face 400 with a plurality of facets (420, 422, 424, and 426) as illustrated in FIG. 4B. This may include the creation of a new vertex 428. The position of the vertex 428 is constrained to be on the surface of convex face 400. Four new edges are also created 430-436. The new edges are not constrained to lie on the convex face but are defined by two vertices. For example, edge 430 is a straight line segment defined by vertex 428 and vertex 402. Alternatively, the face 300 may be represented by two facets.

Figure 4C:
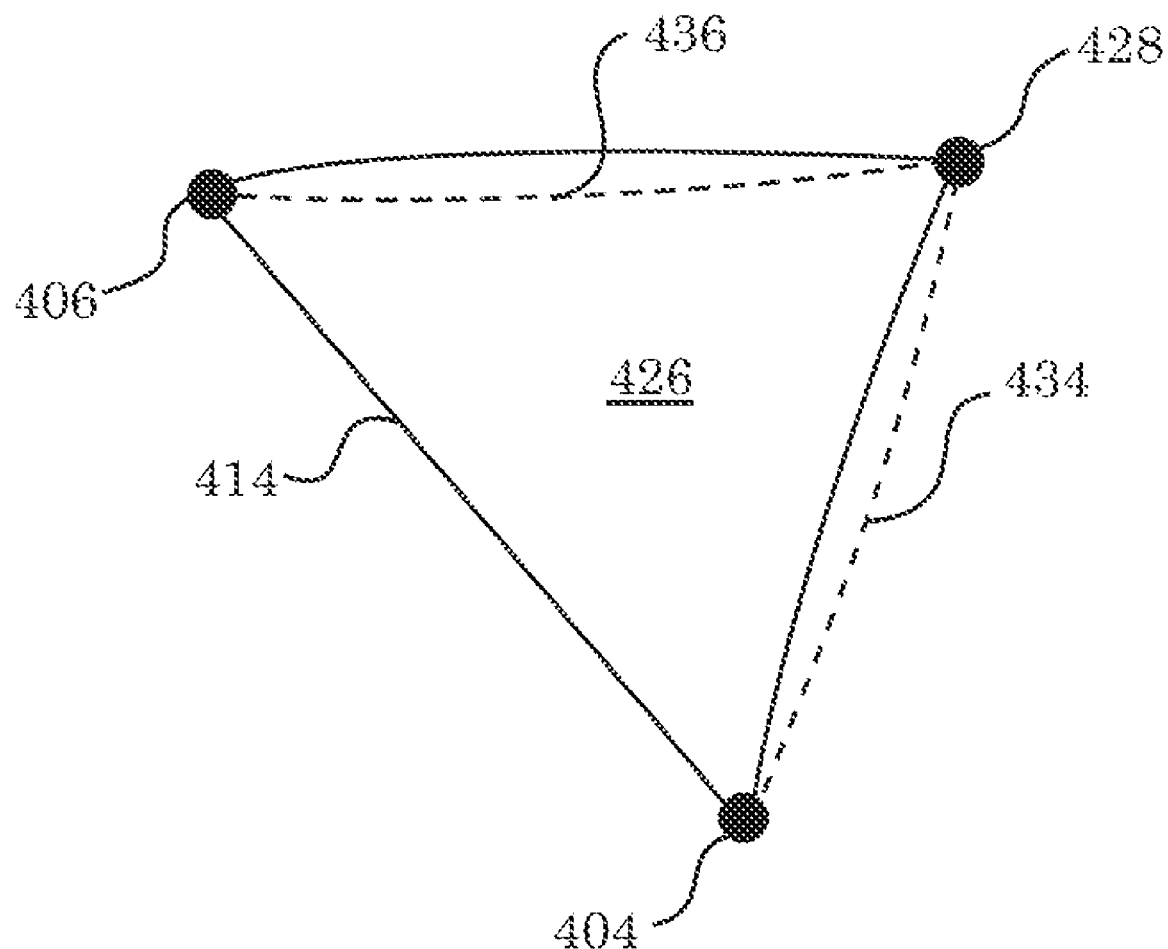

FIG. 4C is an illustration of facet 426 and the portion of face 400 that the facet 426 represents. The facet 426 is a plane defined by the three vertices 404, 406, and 428. The extant of the facet is bounded by the three edges 414, 434 and 436.

Refinement

Figure 5A:
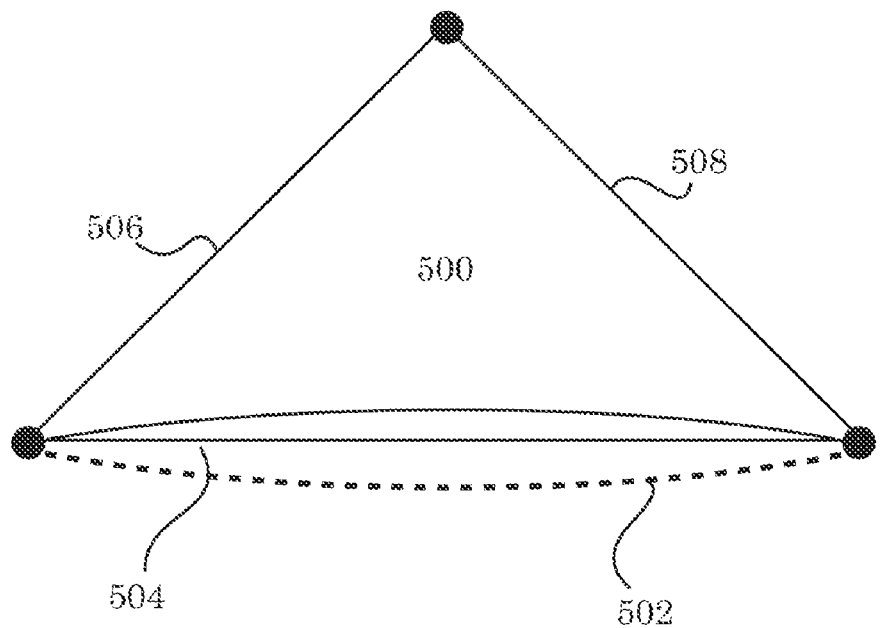
FIGS. 5A-5B are illustration of the refinement procedure.

The initial vertices provided to a surface evolver type program are a starting point. The next step is refinement. Refinement is a triangulation procedure. The initial surface is defined in terms of a set of facets as discussed above. FIG. 5A is an illustration of an exemplary facet 500 with a line constraint 502 and edges (504, 506, and 508).

Figure 5B:
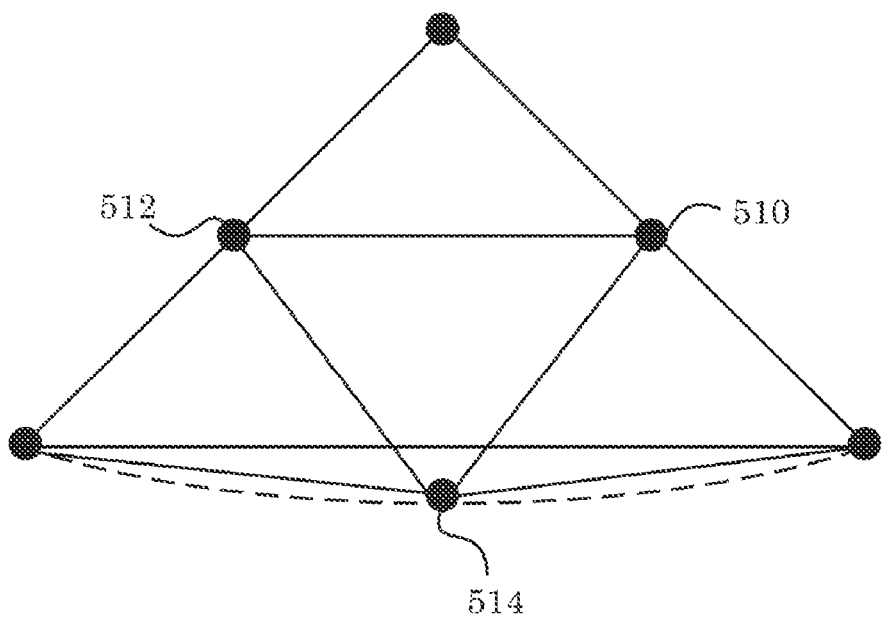

The refinement procedure as shown in FIG. 5B involves the insertion of three new child vertices (510, 512, and 514). Each of the new vertices is at the midpoint of a parent edge. For example child vertex 510 is at the midpoint of edge 508. Child vertex 514 is dependent upon edge 504. Edge 504 is subject to line constraint 502. Child vertex 514 is at the midpoint of line constraint 502. Thus, four new child facets are formed from facet 500. Each child facet is created based upon the parent facet and the constraints upon the parent facet.

Concave Convex Face

Figure 6A:
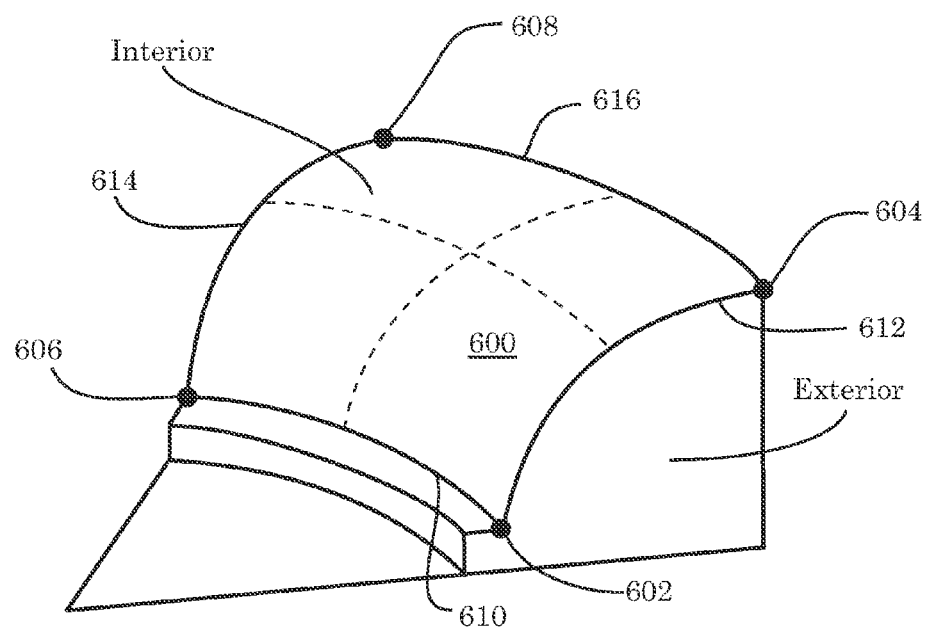
FIGS. 6A-B are illustrations of a convex-concave face.

FIG. 6A is an illustration of a concave-convex face 600 that is concave along one axes and convex along a second axes. The concave-convex face 600 may be defined in terms of four vertices (602, 604, 606, and 608), and four line constraints (610, 612, 614, and 616).

Figure 6B:
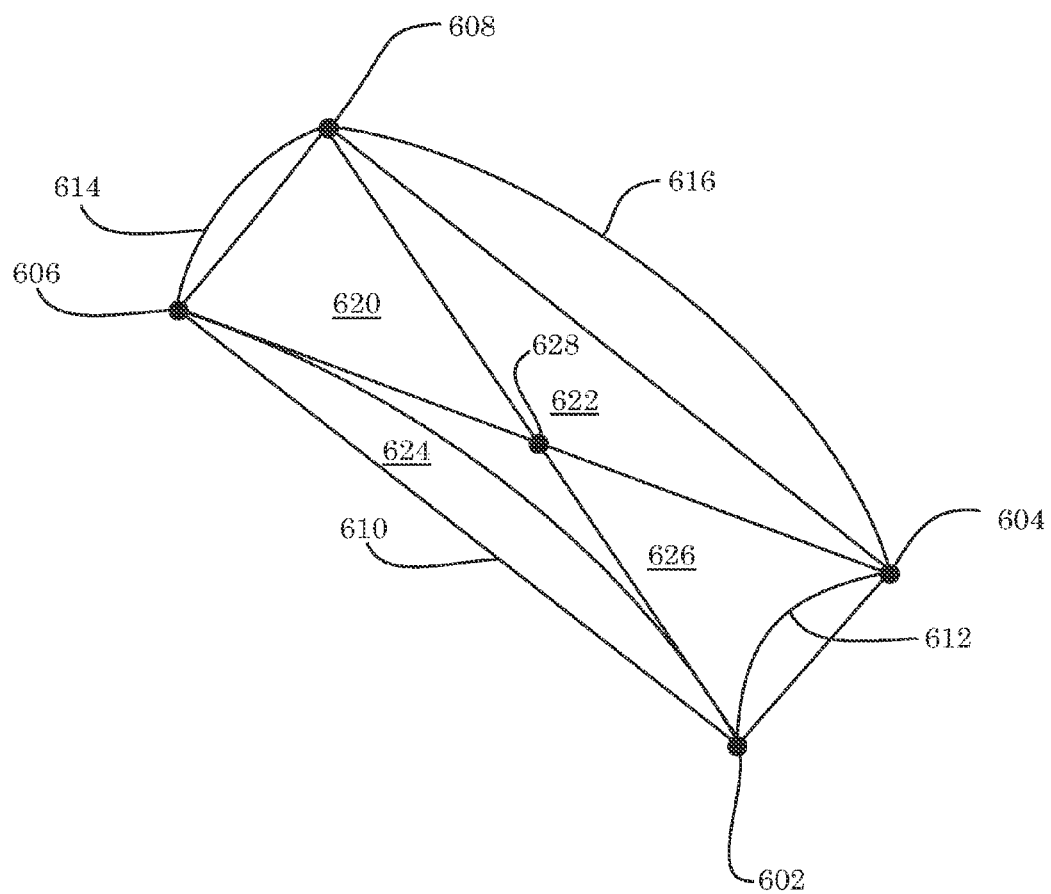

FIG. 6B is an illustration of the concave-convex face 600 that is approximated with a plurality of facets (620, 622, 624, and 626) using the prior art method. This may include the creation of a new vertex 628. The creation of the new vertex also means the creation of four new edges. The new edges are not constrained by the concave-convex face 600 but may be used to give a crude approximation of the convex-concave face.

The surface evolver manual has the following to say about concave faces. "Initial faces should be convex. Although Evolver handles nonconvex faces, the triangulation algorithm is very simple-minded, and the triangulation of a nonconvex face can be ugly. Just put in an extra edge or two to divide the face into a couple of convex faces." Kenneth A. BRAKKE, Surface Evolver Manual 2.30, page 212. The triangulation algorithm is the method used by the Surface Evolver to represent a face The manual specifically suggests dividing the concave face until the resulting divided faces are convex faces. Unfortunately not all faces may be divided into a set of convex faces. For example, concave-convex face 600 may include a line constraint 610 that is a portion of a circle. If concave-convex face 600 is divided into a set of child faces, each child face will inherit a concave constraint from line constraint 610. Thus, the manual does not provide sufficient guidance on how to handle a face that is constrained to remain concave.

The applicants have also found that the triangulation does not become "ugly" when the radius of a circle defining the line constraint 610 is close to 1 μm, but it does become "ugly" when the radius is closer to 27 μm. The applicants have found a method of providing convex initial faces such that when a simple triangulation method is applied to it, the resulting faces are not "ugly" and may be used to represent a convex face.

Special Treatment of the Concave-Convex Face

The applicants have found that under some conditions defining a concave convex face in terms of four vertices is insufficient. The applicants have also found that adding an additional edge or two as suggested by the Surface Evolver manual is also insufficient. The applicants have been able to overcome this limitation of the Surface Evolver by defining the concave convex face in terms of 10 vertices. Four of the vertices are at the corners of the concave convex face. Three of the vertices are distributed equidistantly along a first concave constraint line. Three additional vertices are distributed equidistantly along the second concave constraint line.

Figure 7A:
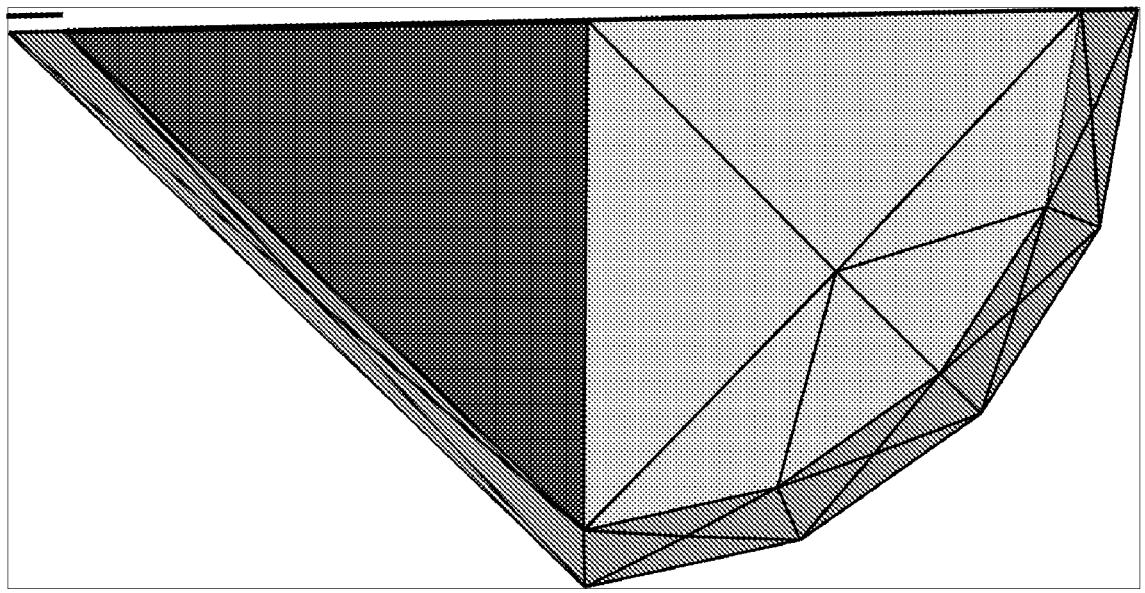
FIGS. 7A-7B is an illustration of the results of an embodiment of the present invention relative the results produced by a prior art method.
Figure 7B:
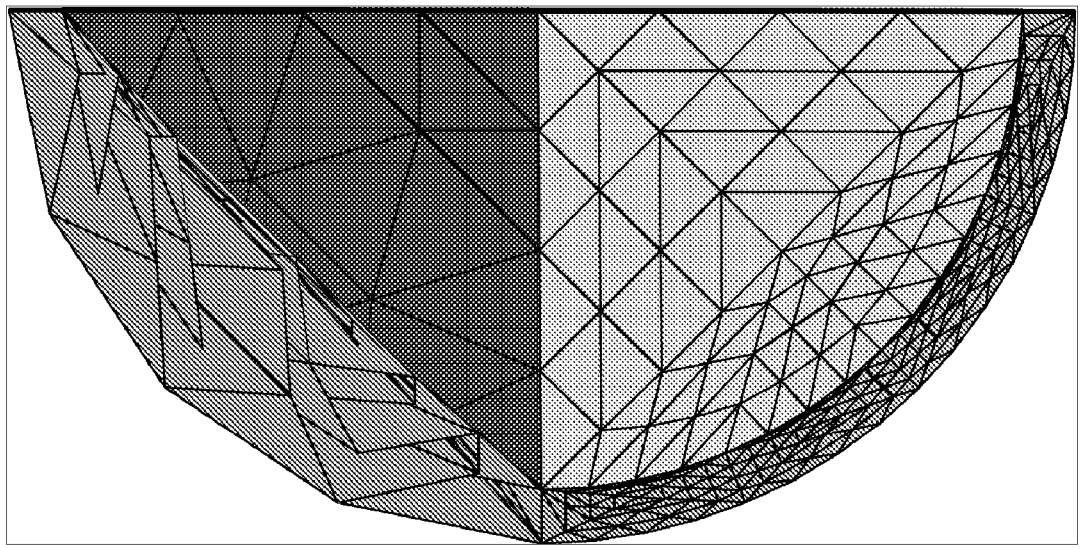

FIG. 7A is an illustration of two corners of an OLED embankment that include concave convex faces. The light gray face on the left is defined in terms of four vertices. The light gray face on the right is defined in terms of 10 vertices. FIG. 7B is an illustration of the results of a refinement procedure being applied to both concave convex faces. FIG. 7B is a projection onto the x-y plane of the triangulations on a three-dimensional surface. An individual skilled in the art will appreciate the results on the left are "ugly" and are a poor representation of the concave convex faces. While the results on the right are not ugly and do a good job of representing the concave convex face. One measure of the ugliness of a triangulation is the error associated with the triangulation. The error may be defined as root mean square of the difference between the constraints, and the edges closest to the constraints. A further indication of an ugly triangulation may be the relative number of elements required to describe the surface. An additional indication of an ugly triangulation is the relative of acuteness of the triangles used to describe the surface.

The concave-convex face may be defined in terms of vertices and constraint lines. The concave restraint may be defined in terms of an inner constraint line and an outer constraint line. The inner constraint line may be defined in terms of an inner curvature $R_1$. In other words, the inner constraint line may be an arc that is best approximated by a portion of a circle with an inner radius $R_1$. The outer constraint line may be defined in terms of an outer curvature $R_2$. In other words, the outer constraint line may be an arc that is best approximated by a portion of a circle with an outer radius $R_2$. The triangulation method in which the present invention is applicable is characterized by its ability represent a concave convex face in which the inner curvature $R_1$ and outer curvature $R_2$ are both small (on the order of 1 μm) and its inability to effectively represent a concave convex face in which the inner curvature $R_1$ and outer curvature $R_2$ are both large (on the order of 50 μm) and the difference $R_1$-$R_2$ is small (on the order of 5 μm). The triangulation method in which the present invention is applicable may also be characterized by its inability to effectively represent a concave convex face when the ratio of the inner radius to the outer radius $R_1/R_2$ is greater than or equal to 0.4.

A Refinement Method

Figure 8A:
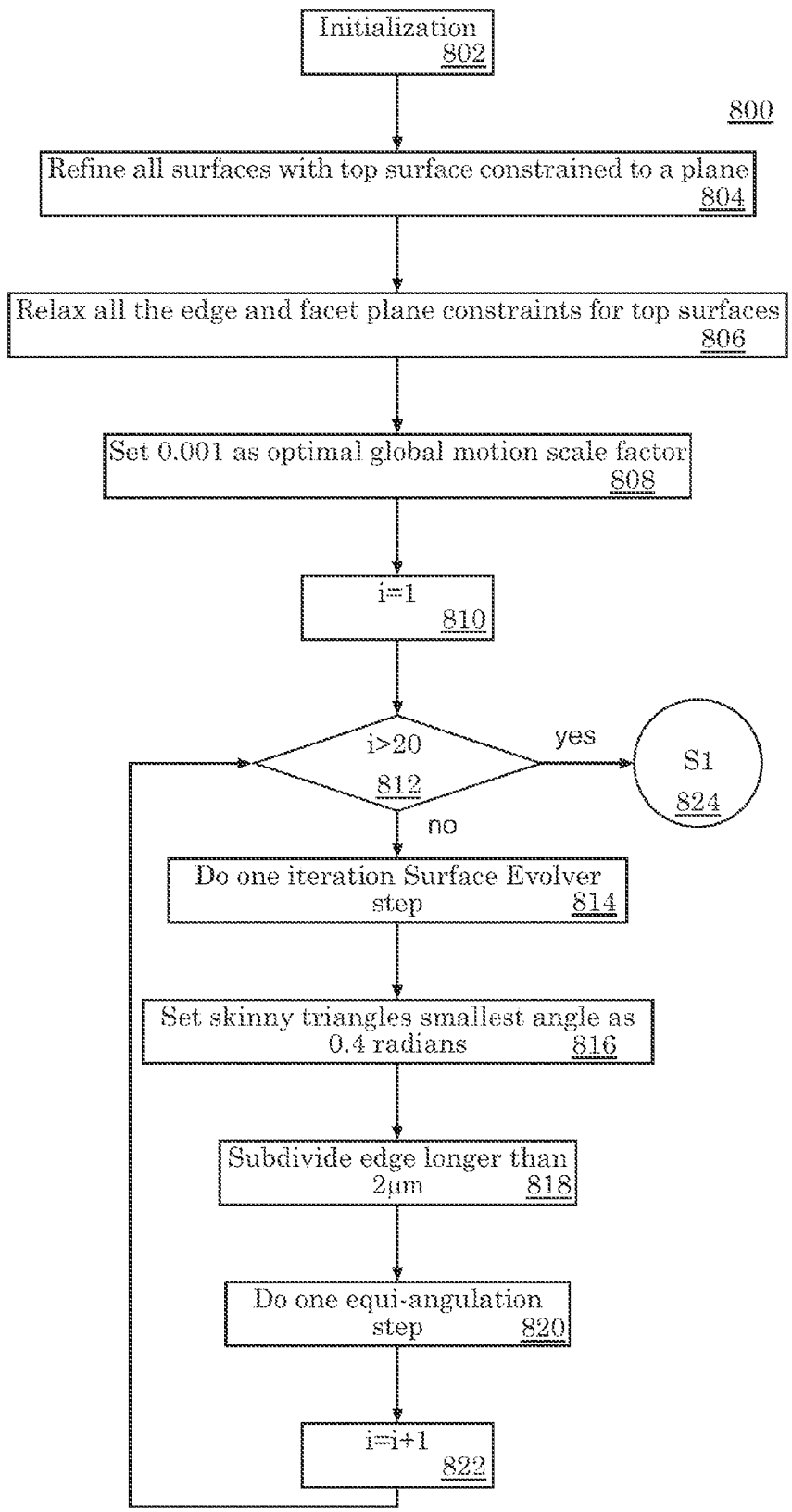
FIGS. 8A-C are illustrations of a method that may be used to practice an embodiment of the present invention.
Figure 8B:
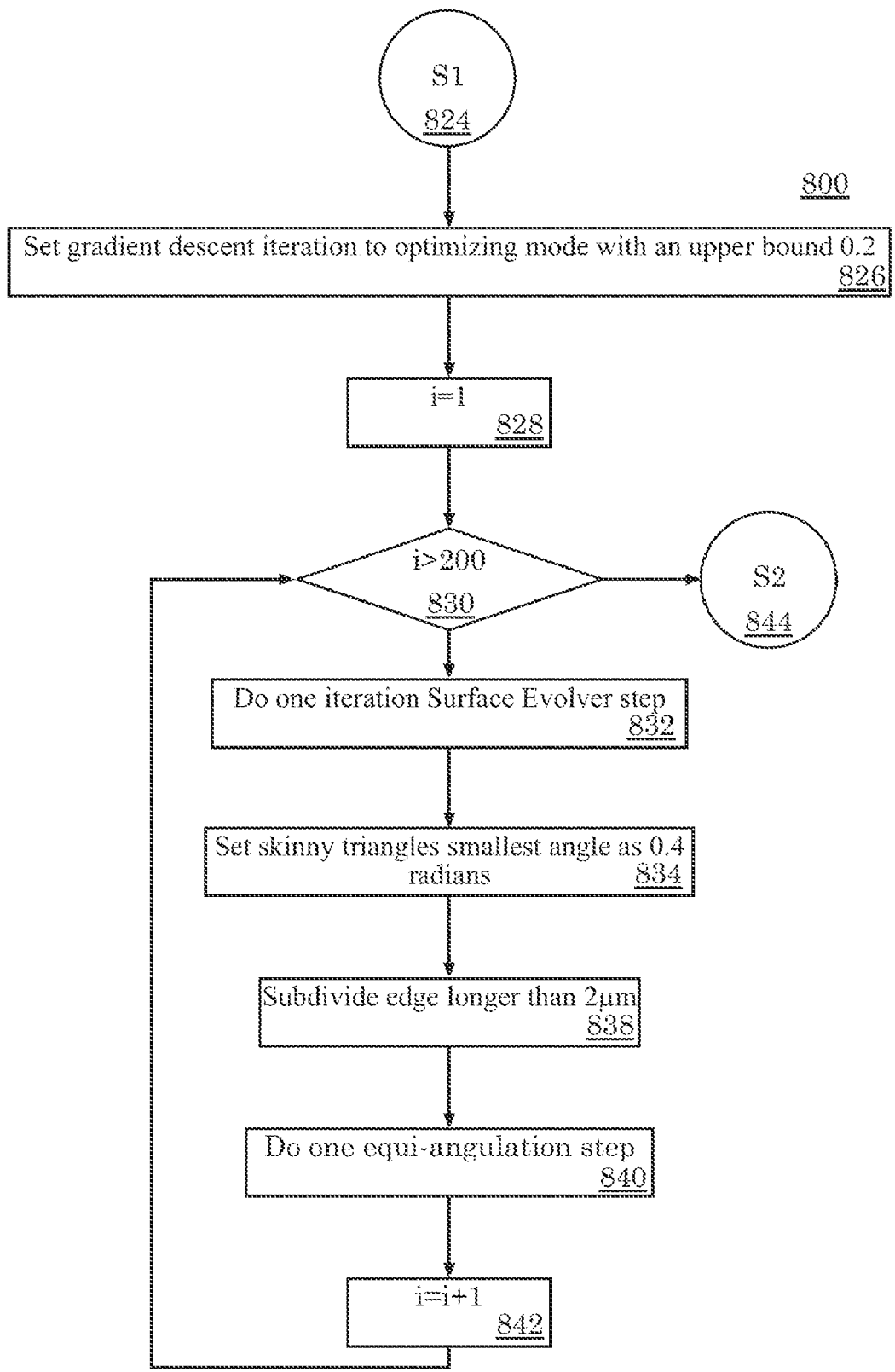
Figure 8C:
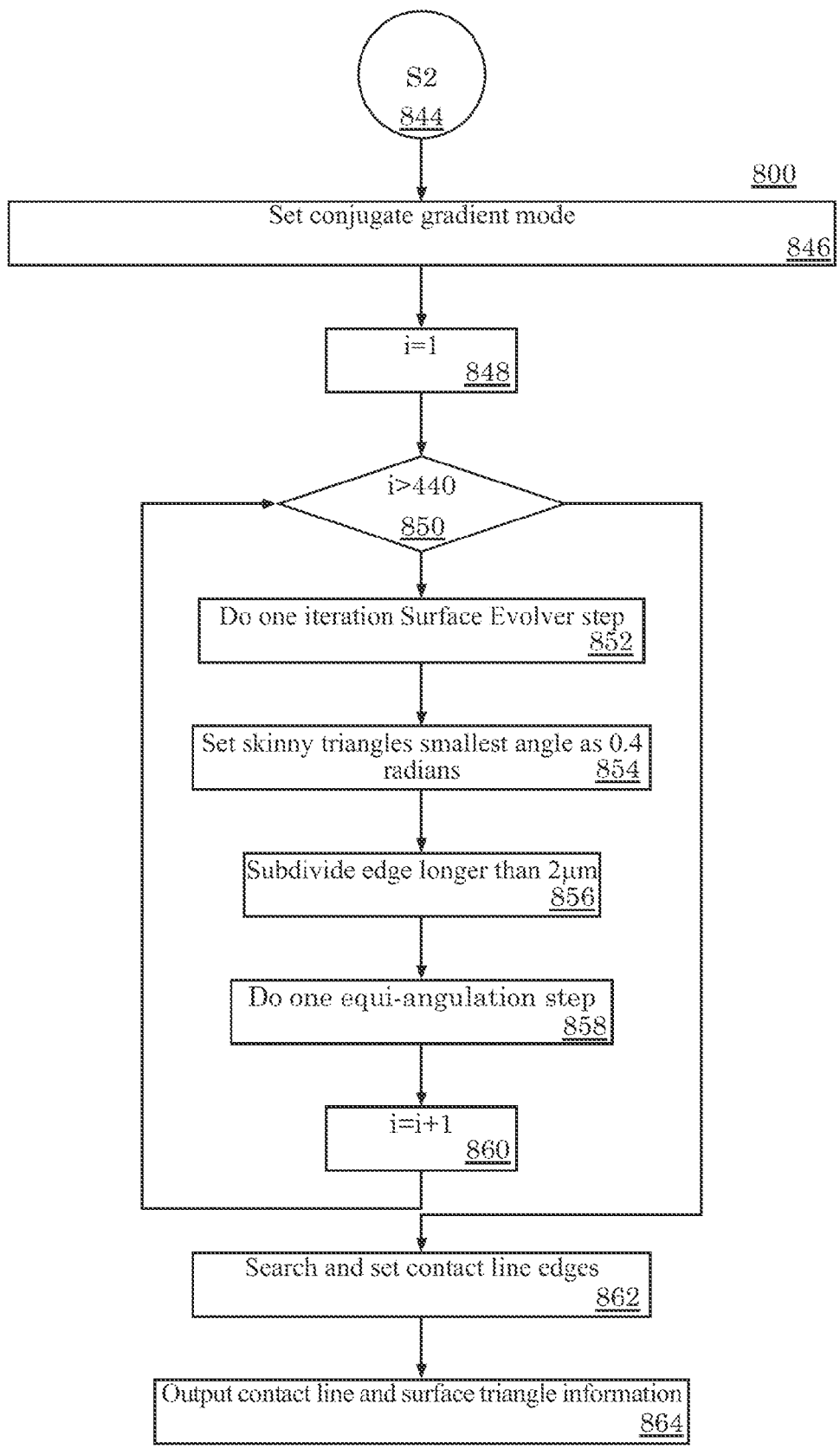

FIGS. 8A-C are illustrations of a method 800 of performing an embodiment of the present invention, that includes instructions for a triangulation procedures and refinement procedures such as those used in The Surface Evolver Program.

In a step 802 an initialization procedure may be performed which may include setting system variables and defining the geometry of the system being simulated. A volume may be defined by a set of surfaces, a set of one or more bottom surfaces may represent a substrate, and a top surface may represent the top of a droplet. The plurality of bottom surfaces along with the top surface encapsulates a volume of space which represents the droplet being simulated. In a step 804 the top surface is constrained to exist in a single plane, while the plurality of bottom surfaces is refined.

In a step 806 the constraint on the edges and the facets of the top surface are relaxed. In a step 808 the optimal global motion scale factor is set to 0.001.

In a step 810 an iteration variable is set to 1. In a step 812 the iteration variable is checked to see if it is less than 20. If the iteration variable is not less than the 20 then method 800 continues to step 824 otherwise it goes on to step 814.

In the step 814 one Surface Evolver step is performed. A surface evolver step involves moving the vertices to minimize the energy associated with system. In a step 816 identify skinny triangles whose smallest angle is less than 0.4 radians or 22.92°, and divide the longest edge of each skinny triangle by two. In a step 818 edges longer than 2 μm are divided in half. In a step 820 an equi-angulation step is performed. Equi-angulation includes swapping an edge that divides two triangular facets if the resulting triangles are closer to an equilateral triangle. In a step 822 the iteration variable is incremented. The method 800 then proceeds back to step 812.

Once the loop consisting of steps 814 through 822 are performed a number of times the method 800 continues on to the second stage 824. In a step 826 the gradient decent method is used to seek a minimum energy. The search method may include halving or doubling the current scale factor until a minimum energy is found. An upper bound for scale may be 0.2.

In a step 828 an iteration variable is set to 1. In a step 830 the iteration variable is checked to see if it is less than 200. If the iteration variable is not less than the 200 then method 800 continues to step 844 otherwise it goes on to step 832.

In the step 832 one Surface Evolver step is performed. In a step 834 identify skinny triangles whose smallest angle is less than 0.4 radians or 22.92°, and divide the longest edge of each skinny triangle by two. In a step 838 edges longer than 2 μm are divided in half. In a step 840 an equi-angulation step is performed. In a step 842 the iteration variable is incremented. The method 800 then proceeds back to step 830.

Once the loop consisting of steps 832 through 842 are performed a number of times the method 800 continues on to the third stage 844. In a step 846 the conjugate gradient mode is set. In the conjugate gradient mode, the search direction is chosen to be in conjugate direction to the previous direction.

In a step 848 an iteration variable is set to 1. In a step 850 the iteration variable is checked to see if it is less than 440. If the iteration variable is not less than the 440 then method 800 continues to step 862 otherwise it goes on to step 852.

In the step 852 one Surface Evolver step is performed. In a step 854 identify skinny triangles whose smallest angle is less than 0.4 radians or 22.92°, and divide the longest edge of each skinny triangle by two. In a step 856 edges longer than 2 μm are divided in half. In a step 858 an equi-angulation step is performed. In a step 860 the iteration variable is incremented. The method 800 then proceeds back to step 850.

Once the loop consisting of steps 852 through 860 are performed a number of times the method 800 continues on to the third stage 844

In a step 862 the contact line edges of the droplet are sought and set. In a step 864 the contact line and the surface triangle information are produced.

EXAMPLE

Figure 9A:
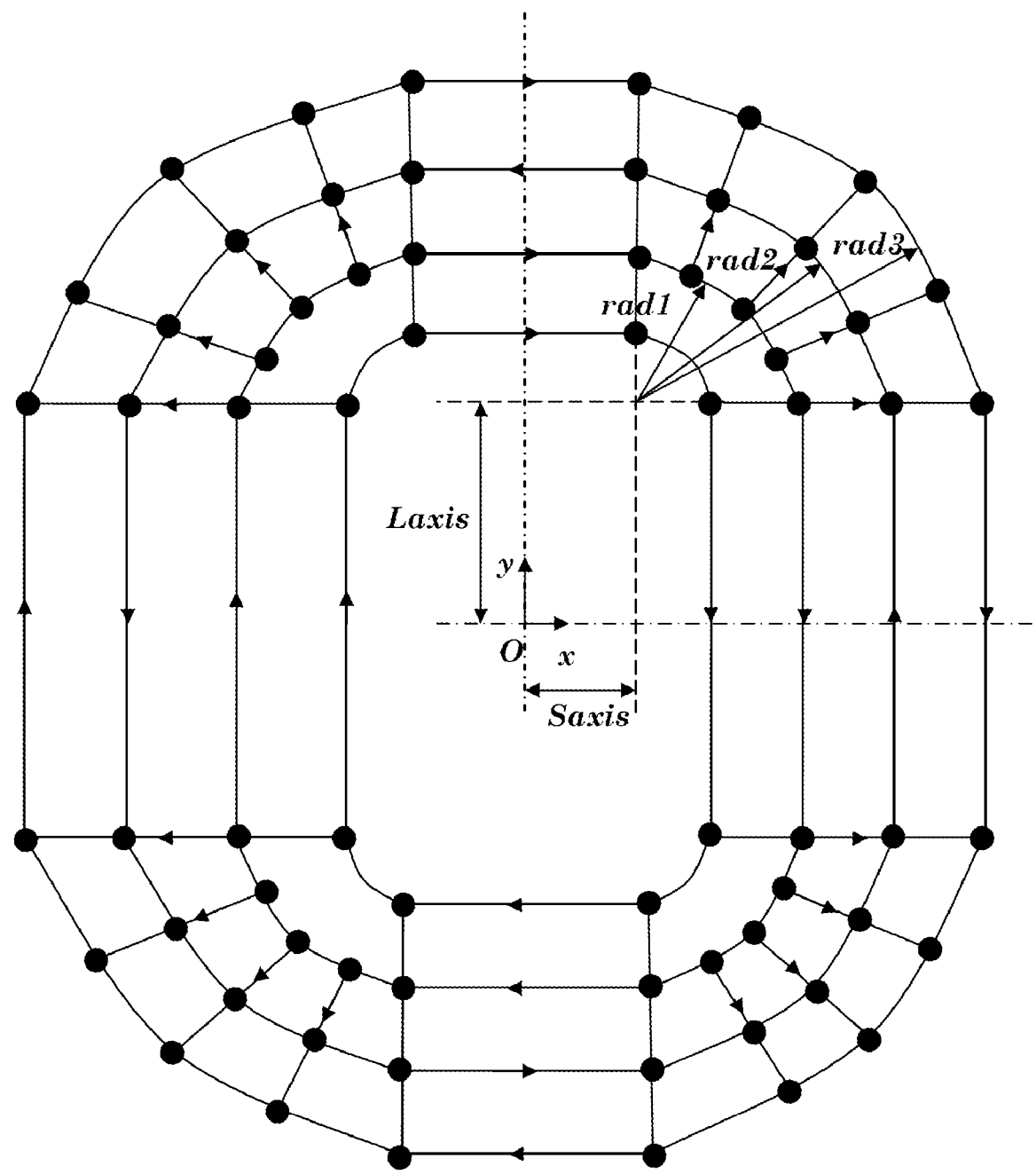
FIGS. 9A-D are results in which an embodiment of the present invention is used to simulate a droplet on an OLED bank structure.

An embodiment of the present invention may be used to describe a surface 900 that includes concave convex face as illustrated in FIG. 9A. FIG. 9A is an illustration of OLED bank structure in FIG. 1 in which the nodes that initially define it are shown as black dots. The profile of the surface 800 may follow the one illustrated in FIGS. 2A-B. Note that FIG. 9A is not drawn to scale.

The origin may be set at the center of the bottom surface as illustrated in FIG. 9A as the point O. A length measurement Laxis (e.g. 121 μm) may represent half the length of a long side wall of an OLED bank structure be simulated. A length measurement Saxis (e.g. 20 μm) may represent half the length of short side wall of the OLED bank structure being simulated. A radius rad1 (e.g. 27 μm) may represent a corner radius at an intersection of ITO layer and the thin film $SiO_2$ layer 104. A radius rad2 (e.g. 30 μm) may represent a corner radius at an intersection of the thin film $SiO_2$ layer 104 and the bank structure 100. A radius rad3 (e.g. 35 μm) may represent a corner radius at the top of the bank structure 100.

Figure 9B:
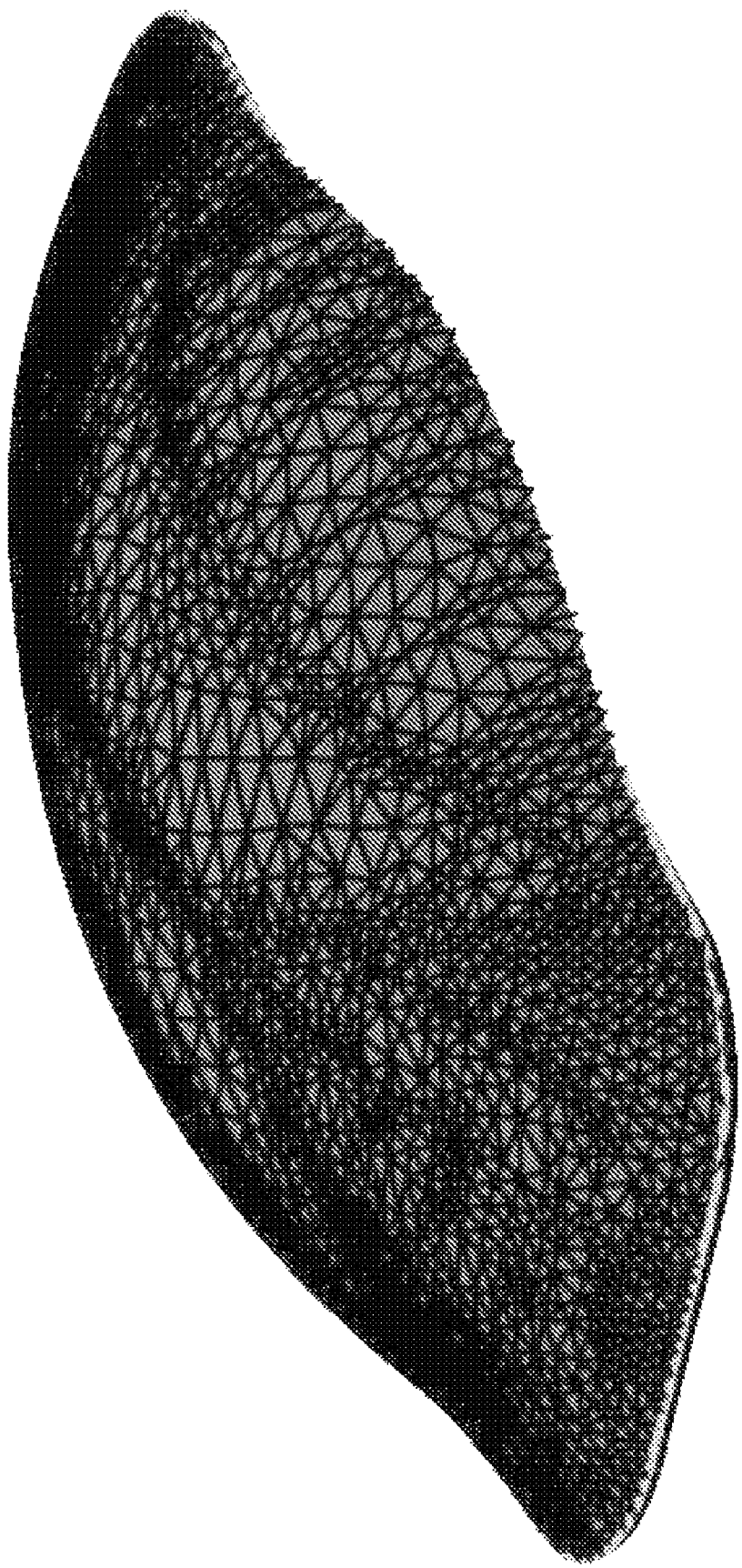

The example shown In FIG. 9B is of a droplet overflowing the OLED bank structure having a volume of 800 pL and a contact angle of 60°. The surface of the droplet was simulated using an embodiment of the present invention. The initial conditions provided to the simulation engine are provided by an embodiment of the present invention. The initial conditions may include a set of vertices, edges, facets, and bounding conditions that represent an approximation of a substrate on which a droplet is resting. A simulation engine such as Surface Evolver may be used to estimate what shape a droplet. The shape of the droplet may be minimized based on a minimum surface energy and an enforcement of the contact angle.

Figure 9C:
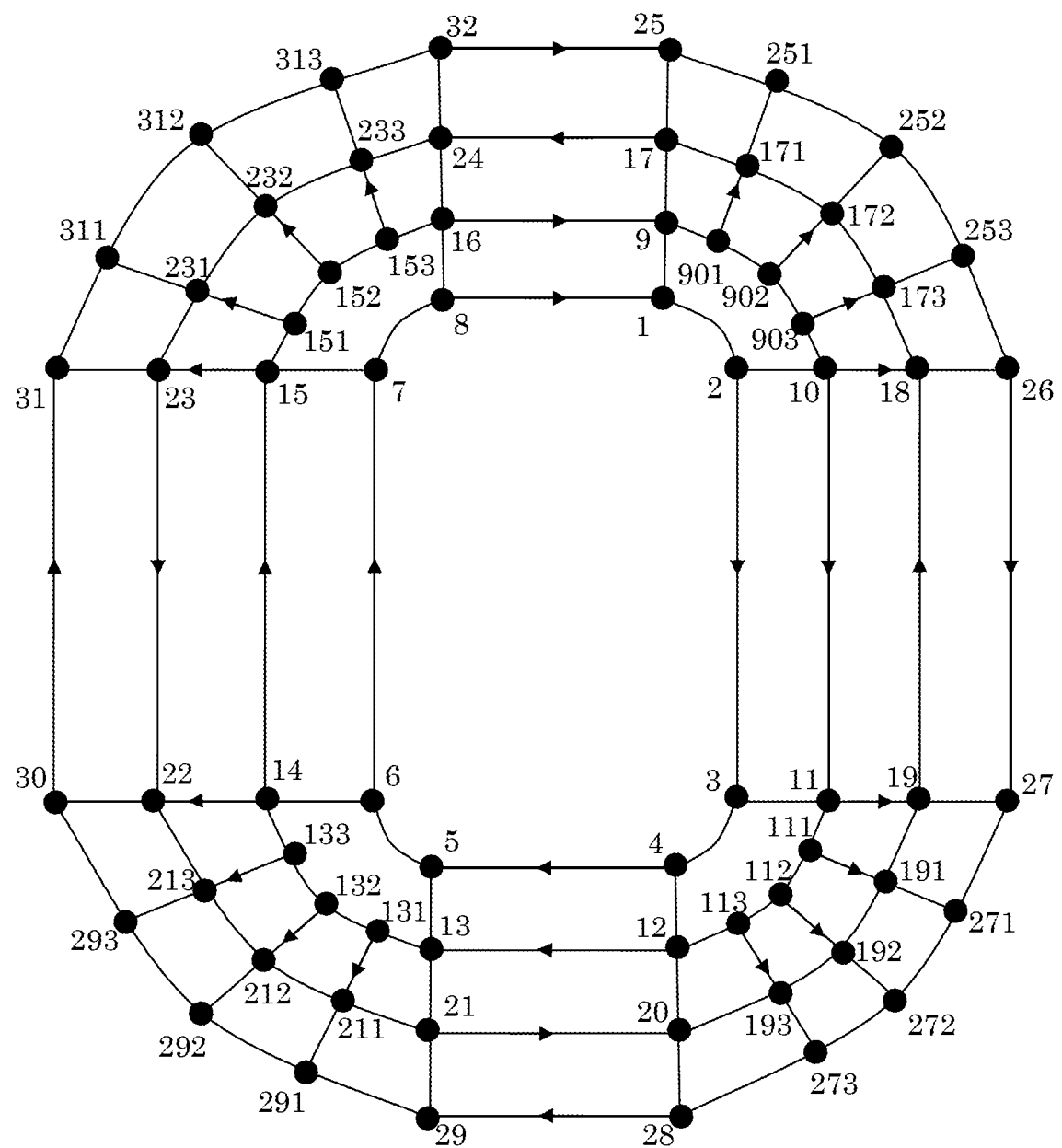

FIG. 9C is an illustration of surface 900 in which all the vertices are identified and numbered. The initial surface 900 may be defined in terms of 68 vertices which are used to represent the key characteristics of the surface.

Figure 9D:
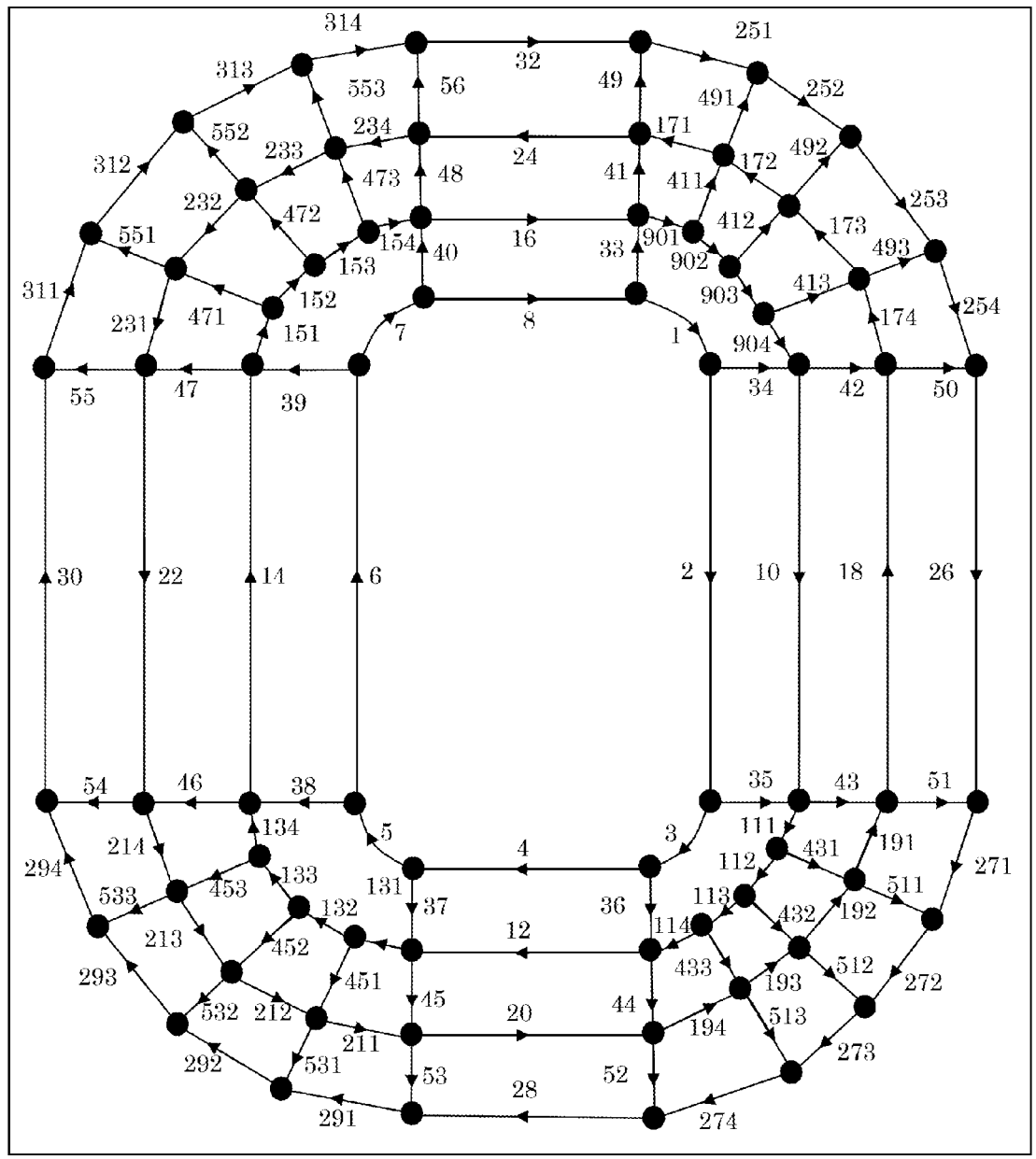

FIG. 9D is an illustration of surface 900 in which each of edges are identified and numbered. Connecting the vertices in FIG. 9C together we come up with 116 edges. The orientation of some of the edges are marked with arrows.

System

Figure 10:
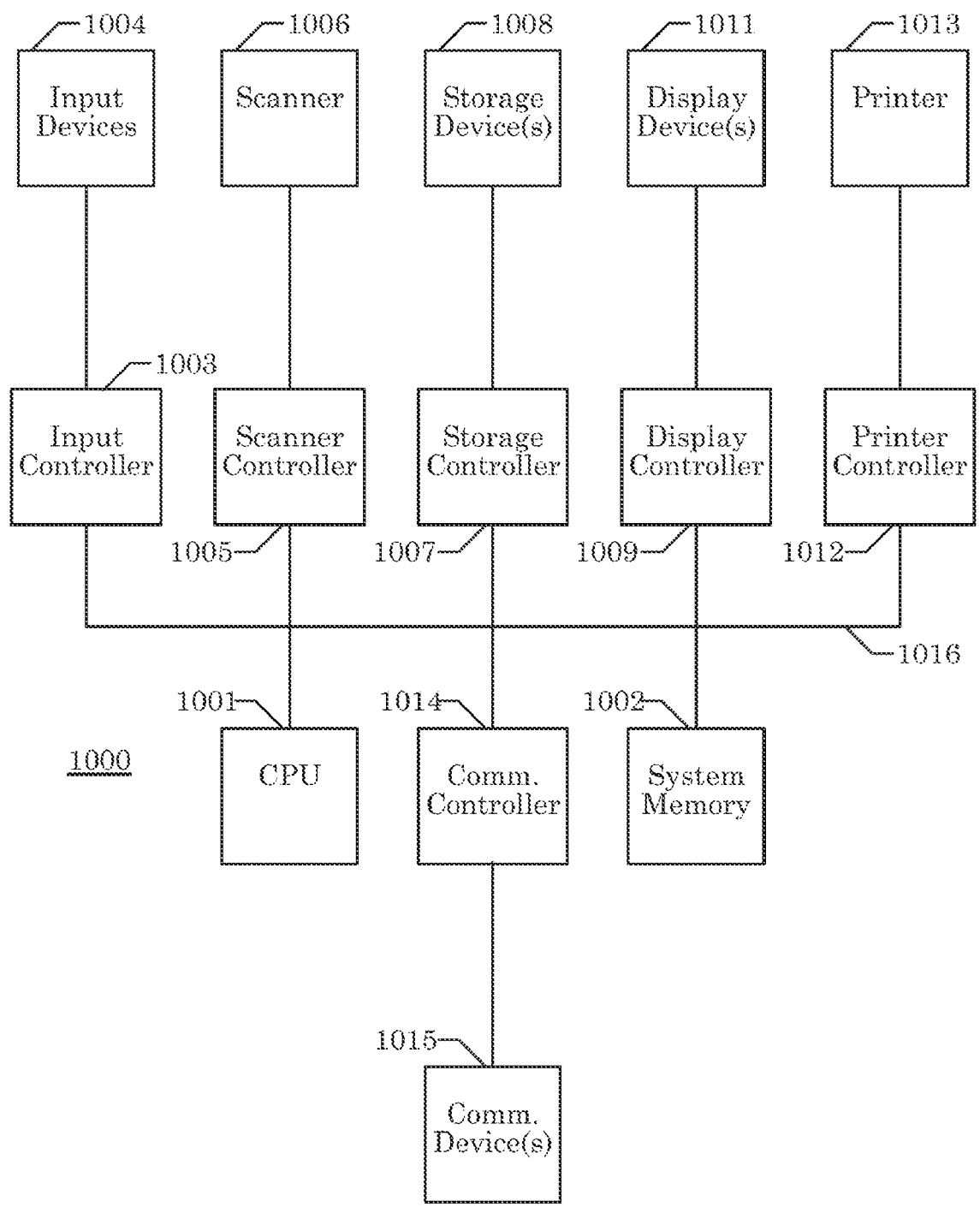
FIG. 10 is an illustration in which an embodiment of the present invention may be practiced.

Having described the details of the invention, an exemplary system 1000, which may be used to implement one or more aspects of the present invention, will now be described with reference to FIG. 10. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A method of determining an equilibrium shape of a droplet body within a curved bank structure of a substrate, comprising the following steps:

(a) determining an initial droplet shape estimate of said droplet body using vertices connected by straight edges and curved lines, said initial droplet shape being dependent upon the contact shape of the interface of the droplet body with the curved bank structure, the contact angle at which the droplet body intersects the substrate, and the droplet volume;

wherein the contact shape of the interface of the droplet body with the curved bank structure includes at least one curved bank structure defined by a corresponding curved bank section of the curved bank structure, the base of the curved bank structure being curved and defined by a first concave line having along said base, the summit of the curved bank structure being curved and defined by a second concave line along said summit, and the angle of the curved bank structure being defined by a convex face spanning from the first concave line to the second concave line, the base and summit of the curved bank structure being concave from the perspective of the interior of the droplet body, and the convex face connecting the base of the curved bank structure to its summit being convex from the perspective of the interior of droplet body, the first concave line having a first radius of curvature, the first concave line being defined by a first vertex at the beginning of the curved base and a second vertex at the end of the curved base, the second concave line having a second radius of curvature, the second concave line being defined by a third vertex at the beginning of the curved summit and a fourth vertex at the end of the curved summit, the convex face being defined by a first convex line coupling the first vertex to the third vertex and a second line coupling the second vertex to the fourth vertex;

(b) applying a refinement procedure to said initial droplet shape estimate to define a refined initial droplet shape, said refinement procedure including:

inserting a first set of three additional vertices evenly spaced along said first concave line between the first and second vertices, and inserting a second set of three additional vertices evenly spaced along said second concave line between the third and fourth vertices; and IF the first and second radii of curvature are of the order of a first predefined radius AND the difference between the first and second radii of curvature is within 5 um, THEN submitting said the resultant initial droplet shape to a triangulation procedure;

(c) submitting refined initial droplet shape to a minimization routine to minimize an energy function and determine a minimum surface energy state for the droplet body, said minimum surface energy state defining said equilibrium shape;

wherein said first predefined radius is 1 um; and wherein said curved bank structure is part of an organic light emitting diode structure.

2. The method of claim 1, wherein said first predefined radius is 50 μm.

3. The method of claim 1, wherein step (b) includes:
ELSE IF the first and second radii of curvature are of the order of a second predefined radius greater than said first predefined radius AND the difference between the first and second radii of curvature is within 5 μm, THEN submitting said the resultant initial droplet shape to a triangulation procedure.

4. The method of claim 3, wherein said second predefined radius is 50 times greater than said first predefined radius.

5. The method of claim 3, wherein said first predefined radius is 1 μm and said second predefined radius is 50 μm.

6. The method of claim 1, wherein the ratio of the first radius of curvature to the second radius of curvature is less than a predefine ratio.

7. The method of claim 6, wherein said predefined ratio is 0.4.

8. A non-transitory computer readable medium having instructions executable by a data processing device to implement the method of claim 1.

9. A data processing system having a data processing device and computer memory, said data processing system being configured to execute the method of claim 1.

* * * * *